United States Patent
Bucar et al.

(10) Patent No.: US 6,395,045 B1
(45) Date of Patent: May 28, 2002

(54) HARD MATERIAL TITANIUM CARBIDE BASED ALLOY, METHOD FOR THE PRODUCTION AND USE THEREOF

(75) Inventors: Wolfgang Bucar, Laufenburg (DE); Hans Zeiringer, Kappel (AT)

(73) Assignee: Treibacher Schleifmittel AG, Villach (AT)

( * ) Notice: Subject to any disclaimer, the term of this patent is extended or adjusted under 35 U.S.C. 154(b) by 0 days.

(21) Appl. No.: 09/508,984

(22) PCT Filed: Aug. 20, 1998

(86) PCT No.: PCT/DE98/02425
§ 371 (c)(1),
(2), (4) Date: May 12, 2000

(87) PCT Pub. No.: WO99/15705
PCT Pub. Date: Apr. 1, 1999

(30) Foreign Application Priority Data

Sep. 19, 1997 (DE) .......................... 197 41 418

(51) Int. Cl.$^7$ .......................... C09K 3/14; C04B 35/56; B24D 3/00
(52) U.S. Cl. .............................. 51/307; 51/293; 51/309; 501/93
(58) Field of Search .......................... 51/307, 293, 309; 501/93; 428/698, 699

(56) References Cited

U.S. PATENT DOCUMENTS

| | | | | |
|---|---|---|---|---|
| 4,132,534 A | * | 1/1979 | Valdsaar | 51/307 |
| 4,403,015 A | * | 9/1983 | Nakai et al. | 428/565 |
| 4,543,343 A | * | 9/1985 | Iyori et al. | 51/309 |
| 5,106,674 A | * | 4/1992 | Okada et al. | 407/119 |
| RE34,180 E | * | 2/1993 | Nemeth et al. | 428/547 |
| 5,370,944 A | * | 12/1994 | Omori et al. | 428/548 |
| 5,545,248 A | * | 8/1996 | Tokumoto et al. | 75/238 |
| 5,976,707 A | * | 11/1999 | Grab | 428/548 |

FOREIGN PATENT DOCUMENTS

| | | | | |
|---|---|---|---|---|
| DE | PS 10 49 290 | | 1/1959 | |
| DE | 2128270 | | 12/1971 | ........... C04B/35/56 |
| DE | 2842042 | | 4/1979 | ........... C04B/35/56 |

OTHER PUBLICATIONS

Metall 36. Jahrgang Heft Apr. 4, 1982 pp. 388–393, H.P. Krug, J. Krüger, K. Krone et al.

Ber. Dt. Keram. Ges 53 (1976) Nr. 9, L. Angelin, G. Cevales, pp. 252–254 (No Month).

Metall. 39. Jahrgang. Heft Jul. 7, 1985, H. Holleck pp. 634–645.

\* cited by examiner

*Primary Examiner*—Michael Marcheschi
(74) *Attorney, Agent, or Firm*—Perkins, Smith & Cohen; Jerry Cohen

(57) ABSTRACT

The present invention relates to a method for producing an abrasive grain from a hard-material alloy based on titanium carbide, with alloying contributions from the group of carbides, nitrides, and/or borides from the secondary groups IVb, Vb, and VIb of the periodic system.

8 Claims, No Drawings

HARD MATERIAL TITANIUM CARBIDE BASED ALLOY, METHOD FOR THE PRODUCTION AND USE THEREOF

The present invention relates to a hard-material alloy, based on titanium carbide, with alloying constituents from the group of carbides, nitrides and/or borides of the transition metals of secondary groups IVb, Vb, and VIb of the periodic system, said alloy being produced by a melting process. Said material can also contain finely divided alloying elements such as Cu, Ni, Si, Al, Sc, Fe, and Mn. It is preferred that the range of applications for the material include its use as abrasive grain in abrasive agents, as high-melting point compound in the fire-resistant domain, as anti-abrasive material and/or its use in metal-cutting tools.

Simply put, abrasive agents can be divided into two major groups. In the case of the so-called conventional abrasive agents, carborundum, silicon carbide, or other abrasive agents are used as the abrasive grain; these have been known for a relatively long time, and they can be produced or obtained economically; however, their performance is limited by a lack of hardness or deficient toughness, or other characteristics, such as chemical reactivity, amongst others that are unfavourable properties for the abrasion process. For this reason, recently, more widespread use has been made of the so-called super abrasives such as diamonds and cubic boron nitride; these are characterized by extreme hardness and—as a result of this—extremely good performance as abrasive agents. The disadvantage of super abrasives are their very high production costs associated with the abrasive grain itself. These costs range from one thousand to ten thousand times the production costs for conventional abrasive grains. This notwithstanding, for certain applications, enhanced performance, reduced machine down times, and lower consumption of abrasive agent result in a favourable price/performance ratio. Nevertheless, the scope of application for high-performance abrasive agents remains limited because of their high production costs.

For this reason, it is the objective of the present invention to describe production of an abrasive grain that is economical to produce but which, at the same time, embodies characteristics of high-performance abrasive agents or possesses other properties that are favourable for the grinding process, so as to close the gap between high-performance abrasive grains and conventional abrasive grains. At the same time, it should be possible to use the abrasive grain for the widest possible range of applications.

In addition to extreme hardness, an ideal abrasive grain should also possess other characteristics such as great toughness, resistance to heat and chemicals, good thermal conductivity, etc.

If one considers hardness alone, carbides, nitrides, borides, or mixtures thereof come closest to the high-performance abrasive grains. Thus, for example, the carbides, nitrides, borides of the elements of the transition groups possess a very metallic character, and are characterized by great hardness and high melting points. With regards to their composition, these compounds—unlike their stoichiometric formal composition—are stable over a wide ranges. Even though the use of hard materials as abrasive grains or as abrasive agents has been discussed in the literature, their commercial use as grinding abrasive has not been known to any great extent.

In the usual course of events, the hard materials are produced by direct conversion from the elements; by reduction of the oxide powder in the presence of carbon and nitrogen compounds, gases that contain nitrogen or compounds that contain boron; by solid body/gas reactions or by gas-phase reactions (e.g., from halogens by conversion with organo-metallic compounds). In all of the cases mentioned above, the hard material occurs as finely divided powder with grain sizes in the lower $\mu$m range. However, a dense, pore-free, and relatively coarse grain is required for most uses as grinding agent. In order to obtain such a dense, pore-free, and relatively coarse grain, the powder has to be consolidated and sintered in the presence of sintering agents and/or binding agents. However, because of their high content of binding agent, sintered bodies manufactured in this way are still of only limited hardness or, in their pure form, are so brittle that they are not suitable as abrasive grain.

For these reason, up to now, hard materials have only been used in the abrasive-agents industry in finely divided form, as burnishing and polishing agents.

DE-OS 2 842 042 and DE-OS 2 646 206 disclose abrasive agent particles based on TiC, TaC, and ZrC, whose basic matrices contain titanium boride particles. The disadvantage of these materials, which are consolidated by hot-pressing, is the costly production methods that are involved, and their residual porosity—despite the costly process—both of which make it difficult to ensure economical and widespread use in the grinding process. It is not known whether or not materials of this kind can be used in any notable quantities as abrasive agents in the abrasive-agent branch.

DE-PS 1 049 290 also discusses the fact that titanium carbide in combination with other carbides has been used for abrasive purposes. At the same time, however, mention is made of the fact that it is of only limited use because of its brittleness.

In addition to the previously defined objective, it is a further objective of the present invention to describe the preparation of hard materials for abrasive purposes, said hard materials not displaying the disadvantages of the materials that form the prior art, as discussed heretofore.

This objective has been achieved by the present invention.

Most surprisingly, it has been found that hard material alloys based on titanium carbide, produced by a melting process, are extremely hard and are also relatively tough, so that they can be used successfully as abrasive grain.

It is preferred that oxides or mixtures of oxides be used as raw materials, these having been converted by lampblack, metals, or other reducing agents in the presence of compounds that contain carbon or boron to form the corresponding carbides or borides. In the same way, however, it is also possible to use the appropriate hard-material powder that corresponds to the alloy directly, or to use other compounds or the metals themselves as the starting materials. The raw-materials mixtures are advantageously smelted in arc or plasma furnaces, in air or an inert atmosphere, as desired. In order to produce nitrides or carbon nitrides, it is advantageous to perform this work in a nitrogen atmosphere.

A further way to produce the hard material alloys is by so-called SHS synthesis (Self-Propagating High Temperature Synthesis), in which the high temperatures required for melting or reaction are generated in situ by appropriate exothermic reactions of the starting materials.

The advantage of the production methods by way of the smelt or the SHS method is that no metal-binding phase is needed in order to produce a dense body of the hard-material alloy or of the hard material, although this does not preclude the fact that the metallic phases can be used and contained as alloying components.

The structure of the hard-material alloy, which exerts a major influence on grinding performance, is formed directly from the smelt and can, if necessary, be optimized by subsequent heat treatment. Depending on the conditions under which cooling takes place, and the selection of the starting materials, the primary crystals of the hard-material alloy will be of a diameter from one to several hundred μm. In the case of eutectic composition, and depending on subsequent annealing it is, however, possible to obtain a much finer structure. As product, one obtains a smelted hard-material regulus that can be formed into the desired grain size or grain by subsequent reduction and screening, for use in abrasive agents.

As a finely divided powder, the hard-material alloy according to the present invention can be also be used as starting material for producing shaped parts for the refractories industry, for manufacturing abrasive parts, and for cutting tools.

The present invention will be described in greater detail below on the basis of examples, without necessarily being restricted thereto.

EXAMPLES

Example 1

An oxide mixture consisting of 3000 g $TIO_2$ (Bayertitan T, Bayer AG), 2814 g $V_2O_3$ (Treibacher Ind. AG) is carefully homogenized with 2372 g of carbon in the form of flame soot (Luvocarb-Ruβ, non-beaded, Lehmann & Voss & Co.) to reduce the oxide to the corresponding carbides. This was shaped by compaction (Bepex compactor) at a pressure of 80–110 kN into a pelletized, compact form and then smelted down in a smelting reactor with graphite electrodes and water-cooled crucible, in an electric arc at 52 V and a power of 100 kW.

The water cooling prevents the smelt from reacting too strongly with the carbon or graphite cladding of the crucible. Preliminary testing has shown that to some extent carbon is transferred from the electrodes into the smelt, although this can be reduced to a minimum by an appropriate smelting regime. For this reason, the need for carbon to reduce the oxides is below the calculated theoretical composition according to the formula.

The hardened regulus is then reduced—using equipment that is customarily used in reduction technology—to a grain that is suitable for the particular application, and graded. The grain that is produced by this process, with a formula composition of $Ti_{0.5}V_{0.5}C_{0.8}$, is characterized by a coarse crystalline structure with polygonally formed crystals of a size ranging from some 30 μm to several hundred μm, which is for all practical purposes free of pores, has an very low oxygen content, and is free of carbon.

The formula is quoted because it is impossible to rule out the fact that the burden components can be carried off in various quantities, sometimes as a vapour phase, during smelting in the arc.

Example 2

An oxide mixture consisting of 4000 g $TiO_2$, 1802 g $MoO_3$ (H.C. Starck, Grade I) and the sub-stoichiometrically calculated quantity of carbon of 2250 g is dosed with 3 g $B_4C$ (Elektroschmelzwerk Kempten, $B_4C$-100 mesh) is order to obtain a low boron content in the end product (e.g., 0.3% B); this is then carefully mixed and homogenized, and brought to a pelletized form by compaction, and then processed further as in Example 1. Because of its boron content, which is partially dissolved in the lattice structure, the resulting grain of the approximate composition $(Ti_{0.8}MO_{0.2})(C_{0.8}, B)$ displays improved abrasive behaviour as compared to the undosed hard-material alloy.

Example 3

5000 g titanium oxide was mixed and homogenized with 1875 g boron oxide ($B_2O_3$) and 2450 g soot in order to obtain a hard-material alloy of eutectic composition (57+−2 mol %TiC) in the $TiB_2$—TiC system, and then processed further as in Example 1.

The grain that is obtained in this way has a eutectic structure of TiC and $TiB_2$ crystals with a size in the range from preferably 1 to 10 μm; because of the structure, it is characterized by particular strength properties. The titanium oxide can also be replaced by an oxide additive from the IVb, Vb, VIb elements of the periodic system.

Example 4

In order to obtain a hard-material alloy from the TiC—$TiB_2$ system, a raw-materials mixture consisting of 5000 g $TiO_2$, 1548 g boric acid ($H_3BO_3$) and 2300 g flame soot was processed with approximately 80 mol-% TiC and 20 mol-% $TiB_2$ as in the previous examples.

The alloy is characterized by equally divided $TiB_2$ crystals with a preferred size ranging from 1–20 μm imbedded in a base matrix of TiC.

Example 5

5000 g titanium oxide and 1545 g $ZrO_2$ (Baddeleyit BC99 SH, Foskor Ltd.) and 2600 g carbon in the form of flame soot was processed as in Example 1. The finished grain is then annealed in an inert atmosphere, at temperatures between 1100° C. and 2200° C., in order to achieve fine separations, consisting of Ti carbide rich (Ti,Zr) and Zr carbide rich (Zr,Ti) C-mixed crystals.

Example 6

A mixture of 3000 g $TiO_2$, 2316 g $MoO_3$, and 1900 g soot was prepared and processed as in Example 1, with the difference that the smelting of the oxide-soot mixture was effected as nitrogen was introduced during the smelting process in order to obtain carbon nitrides in the end product.

Assessment of the abrasive ability of the hard-material alloys was effected by grain scratch test with fractions of 0.5 to 1 mm in comparison to conventional abrasive agents, according to the following parameters:

| | |
|---|---|
| Material: | 100 Cr 6 (1.3505), hardness 66 HRC |
| Cutting speed | 30 m/s |
| Feed speed of workpiece | 0.5 mm/s |
| Advance | 0.020 mm |
| Cooling lubricant | 3% Esso BS 40 |

The performance factor that is cited is calculated from the quotients of the cross section of the scratch track at 1 mm, relative to the scratch cross section at a scratch length of 25 mm.

Results:

| Abrasive | Performance factor A1/A25% |
|---|---|
| $(Ti_{0.5}V_{0.5})C$ (Example 1) | 68 |
| $(Ti_{0.8}Mo_{0.2})(CO_{-0.8}B)$ (Example 2) | 66 |
| $(Ti_{0.5}V_{0.5})C + 0.5\%$ Cu | 76 |
| $(Ti_{0.7}Mo_{0.3})C$ | 65 |
| $(Ti_{0.8}Zr_{0.2})C$ (Example 5) | 75 |
| $(Ti_{0.34}Nb_{0.33}V_{0.33})C$ | 65 |
| $TiO_{0.85}$ unalloyed | 33 |
| Comparative examples: | |
| SiC, grain 36 | 28 |
| CBN | 95 |
| Pure carborundum white, Alodur ® WSK, grain 36 | 52 |

®Treibacher Schleiffmittel, Villach, Austria

What is claimed is:

1. Method for producing an abrasive grain from a dense substantially pore-free hard material alloy, the alloy consisting essentially of a base component of titanium carbide and a second component selected from the group consisting of carbides, nitrides and borides of one or more metals selected from the group consisting of Ti, Mo, Cr, Ta, V, Zr, Nb, Hf, excluding titanium carbide, in which oxides of Ti and one or more precursers of the second component are carbon reduced by smelting in an arc or plasma furnace and converted to a hard-material regulus and then graded.

2. Method as defined in claim 1, wherein the starting materials are converted by direct exothermic reaction with each other.

3. Method as defined in claim 1, wherein compounds of the corresponding elements are used as starting materials.

4. Method as defined in any of claims 1, 2 or 3, wherein the smelting is completed in air, nitrogen or an inert gas.

5. Method as defined in claim 4, wherein argon is used as the inert gas.

6. Method as defined in any of claims 1, 2 or 3, wherein a compound that contains nitrogen is added to the starting mixture as a nitrogen supplier, and this is broken down during the reaction, when nitrogen is formed.

7. Method as defined in claim 6, wherein the said compound is urea.

8. Method as defined in any of claims 1, 2 or 3, wherein after successful smelting and reduction, the product is subjected to annealing treatment at temperatures between 1100 and 2200° C.

* * * * *